United States Patent
Kray et al.

(10) Patent No.: US 11,913,355 B2
(45) Date of Patent: Feb. 27, 2024

(54) PART-SPAN SHROUDS FOR PITCH CONTROLLED AIRCRAFTS

(71) Applicant: General Electric Company, Schenectady, NY (US)

(72) Inventors: Nicholas J. Kray, Evendale, OH (US); Nitesh Jain, Bengaluru (IN); Gary W. Bryant, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/947,589

(22) Filed: Sep. 19, 2022

(65) Prior Publication Data

US 2023/0258092 A1    Aug. 17, 2023

(30) Foreign Application Priority Data

Feb. 14, 2022  (IN) .............................. 202211007736

(51) Int. Cl.
*F01D 5/22* (2006.01)
*F01D 5/16* (2006.01)

(52) U.S. Cl.
CPC ............... *F01D 5/225* (2013.01); *F01D 5/16* (2013.01)

(58) Field of Classification Search
CPC .......... F01D 5/16; F01D 5/225; F01D 11/005; F01D 11/006; F01D 11/008
See application file for complete search history.

(56) References Cited

U.S. PATENT DOCUMENTS

| 2,472,886 | A | * | 6/1949 | Conrad | F01D 5/22 |
| | | | | | 416/196 R |
| 2,872,988 | A | | 2/1959 | Koch et al. | |
| 3,143,383 | A | * | 8/1964 | Bamberger | F01D 5/22 |
| | | | | | 428/656 |
| 3,708,244 | A | * | 1/1973 | Dawson | F01D 5/22 |
| | | | | | 416/196 R |
| 3,793,195 | A | * | 2/1974 | Betts | C10M 7/00 |
| | | | | | 428/621 |
| 3,990,813 | A | * | 11/1976 | Imai | F01D 5/22 |
| | | | | | 416/196 R |
| 4,257,743 | A | * | 3/1981 | Fujii | F01D 5/22 |
| | | | | | 416/500 |
| 4,798,519 | A | | 1/1989 | Zipps et al. | |
| 5,275,531 | A | * | 1/1994 | Roberts | F01D 11/12 |
| | | | | | 415/173.1 |
| 9,328,619 | B2 | | 5/2016 | Chouhan | |
| 9,506,353 | B2 | * | 11/2016 | Schwarz | F04D 29/666 |

(Continued)

FOREIGN PATENT DOCUMENTS

EP           2336573        6/2011

*Primary Examiner* — Brian P Wolcott
(74) *Attorney, Agent, or Firm* — Hanley, Flight & Zimmerman, LLC

(57) ABSTRACT

Part-span shrouds for pitch controlled aircrafts are disclosed herein. An example apparatus includes a first portion extending from a first airfoil, the first portion including a first surface, the first surface being convex, a second portion extending from a second airfoil towards the first airfoil, the second portion including a second surface the first airfoil circumferentially adjacent to the second airfoil, the second surface being concave, and an interface formed by the first surface and the second surface, the interface reacting circumferential loads between the first airfoil and the second airfoil.

20 Claims, 5 Drawing Sheets

(56) References Cited

U.S. PATENT DOCUMENTS

| | | | |
|---|---|---|---|
| 9,546,555 B2* | 1/2017 | Chouhan | F01D 5/16 |
| 9,822,647 B2 | 11/2017 | Subbareddyar et al. | |
| 9,957,818 B2* | 5/2018 | Martin, Jr. | F01D 5/22 |
| 10,060,271 B2* | 8/2018 | Schwarz | F01D 5/141 |
| 10,132,169 B2* | 11/2018 | McDufford | F04D 29/324 |
| 10,196,908 B2 | 2/2019 | Bielek et al. | |
| 10,563,666 B2 | 2/2020 | Murdock | |
| 10,648,347 B2* | 5/2020 | Chakrabarti | F01D 5/225 |
| 11,149,552 B2* | 10/2021 | Dipietro, Jr. | F01D 5/225 |
| 11,536,144 B2* | 12/2022 | Chakrabarti | F01D 5/225 |
| 2012/0244008 A1 | 9/2012 | Chang et al. | |
| 2014/0086751 A1* | 3/2014 | Bottome | F01D 11/008 |
| | | | 416/193 R |
| 2014/0255207 A1* | 9/2014 | Boyer | F01D 5/186 |
| | | | 416/196 R |
| 2023/0096351 A1* | 3/2023 | Sibbach | F02C 9/00 |
| | | | 415/1 |

* cited by examiner

PART-SPAN SHROUDS FOR PITCH CONTROLLED AIRCRAFTS

RELATED APPLICATION

This patent claims priority to Indian Provisional Patent Application No. 202211007736, filed on Feb. 14, 2022, which is incorporated herein by reference in its entirety.

FIELD OF THE DISCLOSURE

This disclosure relates generally to turbines and, more particularly, to part-span shrouds for pitch controlled aircrafts.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

Pitch variations enable rotating airfoils to be rotated along their radial axis to change blade pitch. This pitch control enables these airfoils to maintain optimal angle attack in variety of ambient and aircraft conditions. Pitch control on rotating airfoils increases the overall efficiency of the gas turbine engine.

Figure 1:
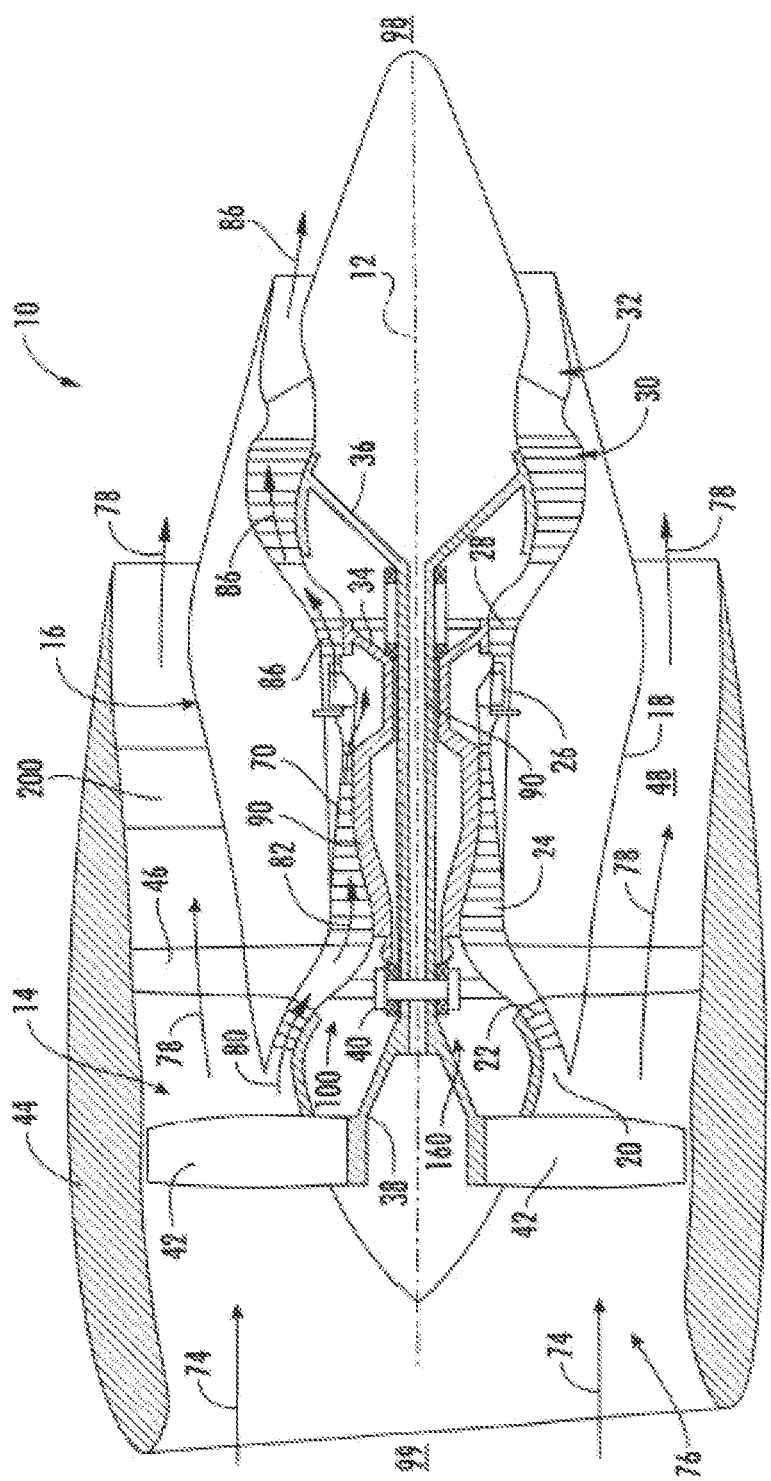
FIG. 1 is a cross-sectional view of an example turbofan gas turbine engine in which examples disclosed herein may be implemented.
Figure 1:
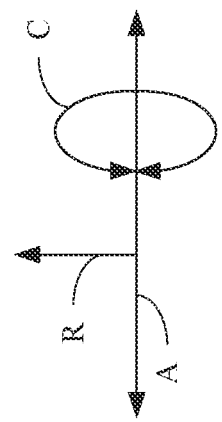

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Aircrafts include engines that act as a propulsion system to generate mechanical power and forces such as thrust. A gas turbine, also called a combustion turbine or a turbine engine, is a type of internal combustion engine that can be implemented in the propulsion system of an aircraft. For example, a gas turbine can be implemented in connection with a turbofan or a turbojet aircraft engine. Gas turbines also have significant applications in areas such as industrial power generation.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe example implementations and not to be taken limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

The terms "upstream" and "downstream" refer to the relative direction with respect to fluid flow in a fluid pathway. For example, "upstream" refers to the direction from which the fluid flows, and "downstream" refers to the direction to which the fluid flows.

In some examples described herein, the locations of features on a airfoil are described with reference to a percentage of the span of the blade. In such examples disclosed herein, the percentage refers to spanwise location of the feature relative to the root of the blade. Particularly, a feature at 0% span is at the root of the airfoil, a feature at 100% span is at the tip of the airfoil, a feature at 50% span is disposed halfway between the tip and root, etc.

In some examples used herein, the term "substantially" is used to describe a relationship between two parts that is within three degrees of the stated relationship (e.g., a substantially collinear relationship is within three degrees of being linear, a substantially perpendicular relationship is within three degrees of being perpendicular, a substantially parallel relationship is within three degrees of being parallel, etc.).

As used herein, the terms "axial" and "longitudinal" both refer to a direction parallel to the centerline axis of a gas turbine (e.g., a turbofan, a core gas turbine engine, etc.), while "radial" refers to a direction perpendicular to the axial direction, and "tangential" or "circumferential" refers to a direction mutually perpendicular to the axial and radial directions. Accordingly, as used herein, "radially inward" refers to the radial direction from the outer circumference of the gas turbine towards the centerline axis of the gas turbine, and "radially outward" refers to the radial direction from the centerline axis of the gas turbine towards the outer circumference of gas turbine. As used herein, the terms "forward", "fore", and "front" refer to a location relatively upstream in an air flow passing through or around a component, and the terms "aft" and "rear" refer to a location relatively downstream in an air flow passing through or around a component.

In some example open-rotor engines, a high vibratory load is experienced during various phases of the flight due to asymmetric propeller loading (e.g., P-Factor or 1P loading). 1P loading, also referred to as +/−1P loading, refers to movement or force on a blade caused by a blade's excitation frequency relative to rotor revolution. 1P loading usually occurs during operational conditions with high-power and high angles of attack, such as takeoff. 1P loads experienced by an airfoil during operation of the engine may result in deflection of the airfoil (e.g., 1F deflection, etc.). Such deflection produces loads and moments on the roots of affected blade and can causes premature wear and failure of the blade. Some known turboprop or open rotor configuration make replacing individual blades difficult. In many examples, a complex disassembly process must be completed to remove a single blade, which increases the time and cost required to service the gas turbine engines.

Blade deflection can be reacted by part-span shrouds extending from the faces of the blades part-way up the span of the blades. Part-span shrouds can include fins and/or other components that interface (e.g., abut, couple, etc.) with corresponding components of adjacent blades. Part-span shrouds can mitigate the effects of 1P loading and resulting deflections. However, prior-art interfaces between the part-span shrouds prevent pitch-wise rotation of the blades. As such, prior-art part-span shrouds prevent pitch control of the blades, thereby reducing the overall efficiency of the gas turbine engine.

Examples disclosed herein include blades with part-span shrouds that enable pitch-wise rotation of the blades. Examples disclosed herein include part-span shrouds that react forces in the circumferential direction. In some examples disclosed herein, the part-span shrouds react circumferential loads between adjacent circumferential but include features that enable pitch change capability in the rotor airfoils. In some disclosed herein, the part-span shrouds include a first portion separated from a second portion by a curved interface. In other examples disclosed herein, the part-span shrouds include a tie rod coupled to adjacent airfoils via one or more slotted interfaces. In some examples disclosed herein, the part-span shrouds disclosed herein reduce loads carried by the roots of the airfoils the part-span shrouds are coupled to. While the examples disclosed herein are primary disclosed with respect to open rotor engines, the examples disclosed herein can be applied to any suitable type of gas turbine (e.g., turbofans, turboprops, etc.). While example part-span-shrouds disclosed herein are generally disposed at a location that is below 50% of the span of the blade (e.g., 25% span, 30% span, 40% span, etc.), the part-span shrouds can be disposed at any other suitable location.

Example disclosed herein can be applied to both closed and open rotor engine designs. For purposes of illustration only, FIG. 1 illustrates an example closed-rotor turbofan engine, and FIG. 2 illustrates an example open-rotor engine.

Figure 2:
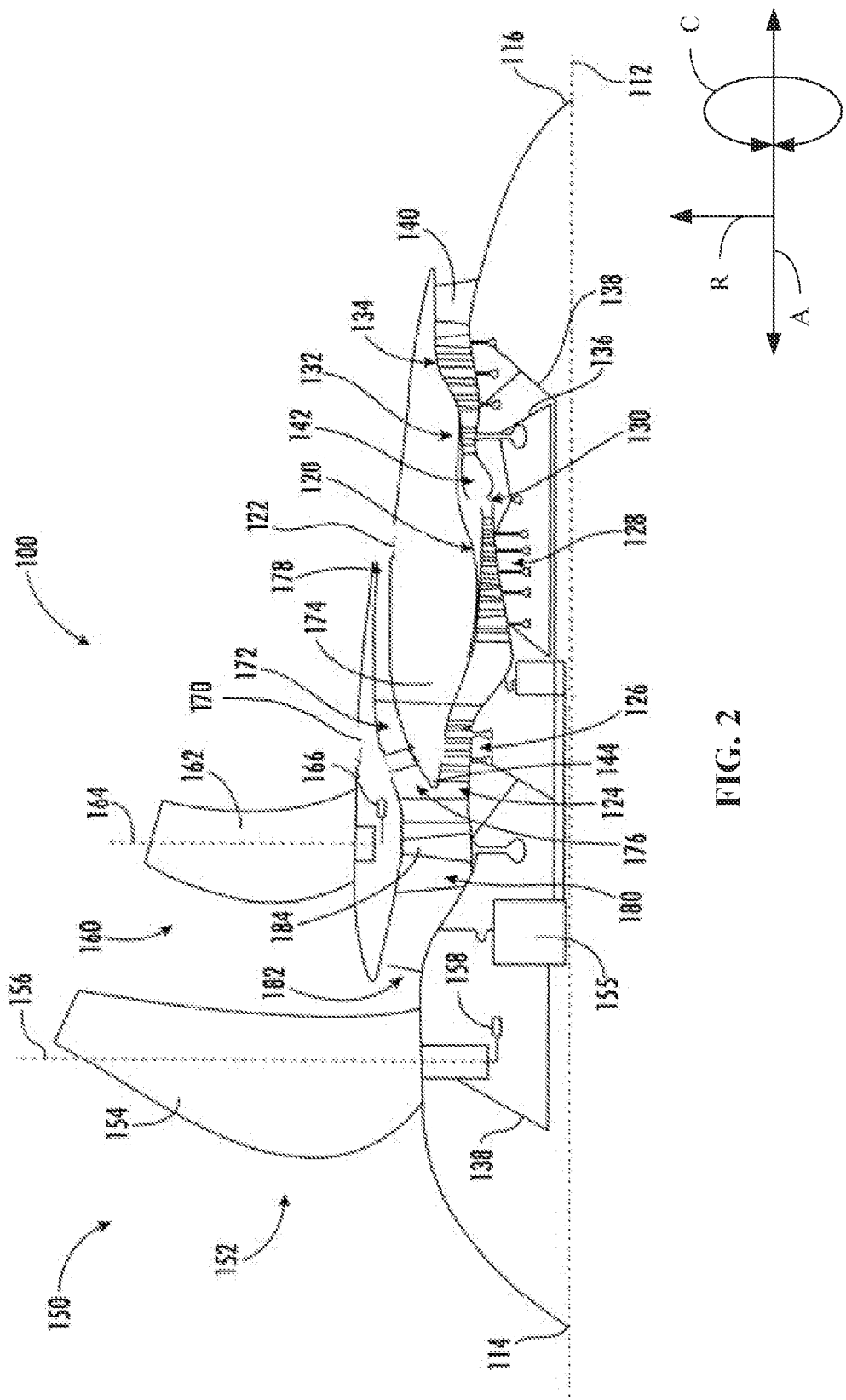
FIG. 2 is a cross-sectional view of an example open rotor engine in which examples disclosed herein may be implemented.

FIG. 1 is a cross-sectional view of a turbofan gas turbine engine in which examples disclosed herein may be implemented. Referring now to the drawings, FIG. 1 is a schematic partially cross-sectioned side view of an exemplary gas turbine engine 10 as may incorporate various examples of the present disclosure. The engine 10 may particularly be configured as a gas turbine engine for an aircraft. Although further described herein as a turbofan engine, the engine 10 may define a turboshaft, turboprop, or turbojet gas turbine engine, including marine and industrial engines and auxiliary power units. As shown in FIG. 1, the engine 10 has a longitudinal or axial centerline axis 12 that extends therethrough for reference purposes. An axial direction A is extended co-directional to the axial centerline axis 12 for reference. The engine 10 further defines an upstream end 99 and a downstream end 98 for reference. In general, the engine 10 may include a fan assembly 14 and a core engine 16 disposed downstream from the fan assembly 14. For reference, the engine 10 defines an axial direction A, a radial direction R, and a circumferential direction C. In general, the axial direction A extends parallel to the axial centerline 12, the radial direction R extends outward from and inward to the axial centerline 12 in a direction orthogonal to the axial direction A, and the circumferential direction extends three hundred sixty degrees (360°) around the axial centerline 12.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a heat addition system 26, an expansion section or turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In certain examples, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially may surround the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a fan flow passage 48 therebetween. However, it should be appreciated that various configurations of the engine 10 may omit the nacelle 44, or omit the nacelle 44 from extending around the fan blades 42, such as to provide an open rotor or propfan configuration of the engine 10 depicted in FIG. 2.

It should be appreciated that combinations of the rotor shafts 34, 36, the compressors 22, 24, and the turbines 28, 30 define a rotor assembly 90 of the engine 10. For example, the HP rotor shaft 34, HP compressor 24, and HP turbine 28 may define a high speed or HP rotor assembly of the engine 10. Similarly, combinations of the LP rotor shaft 36, LP compressor 22, and LP turbine 30 may define a low speed or LP rotor assembly of the engine 10. Various examples of the engine 10 may further include the fan shaft 38 and fan blades 42 as the LP rotor assembly. In certain examples, the engine 10 may further define a fan rotor assembly at least partially mechanically de-coupled from the LP spool via the fan shaft 38 and the reduction gear 40. Still further examples may further define one or more intermediate rotor assemblies defined by an intermediate pressure compressor, an intermediate pressure shaft, and an intermediate pressure turbine disposed between the LP rotor assembly and the HP rotor assembly (relative to serial aerodynamic flow arrangement).

During operation of the engine 10, a flow of air, shown schematically by arrows 74, enters an inlet 76 of the engine 10 defined by the fan case or nacelle 44. A portion of air, shown schematically by arrow 80, enters the core engine 16 through an annular inlet 20 defined at least partially via the outer casing 18. The flow of air is provided in serial flow through the compressors, the heat addition system, and the expansion section via a core flowpath 70. The flow of air 80 is increasingly compressed as it flows across successive stages of the compressors 22, 24, such as shown schematically by arrows 82. The compressed air 82 enters the heat addition system 26 and mixes with a liquid and/or gaseous fuel and is ignited to produce combustion gases 86. It should be appreciated that the heat addition system 26 may form any appropriate system for generating combustion gases, including, but not limited to, deflagrative or detonative combustion systems, or combinations thereof. The heat addition system 26 may include annular, can, can-annular, trapped vortex, involute or scroll, rich burn, lean burn, rotating detonation, or pulse detonation configurations, or combinations thereof.

The combustion gases 86 release energy to drive rotation of the HP rotor assembly and the LP rotor assembly before exhausting from the jet exhaust nozzle section 32. The release of energy from the combustion gases 86 further drives rotation of the fan assembly 14, including the fan blades 42. A portion of the air 74 bypasses the core engine 16 and flows across the fan flow passage 48, such as shown schematically by arrows 78.

It should be appreciated that FIG. 1 depicts and describes a two-stream engine having the fan flow passage 48 and the core flowpath 70. The example depicted in FIG. 1 has a nacelle 44 surrounding the fan blades 42, such as to provide noise attenuation, blade-out protection, and/or other benefits known for nacelles, and which may be referred to herein as a "ducted fan," or the entire engine 10 may be referred to as a "ducted engine."

FIG. 2 is a schematic cross-sectional view of an example open-rotor turbine engine according to one example of the present disclosure. Particularly, FIG. 2 illustrates an aviation three-stream turbofan engine herein referred to as "three-stream engine 100". The three-stream engine 100 of FIG. 2 can be mounted to an aerial vehicle, such as a fixed-wing aircraft, and can produce thrust for propulsion of the aerial vehicle. The architecture of the three-stream engine 100 provides three distinct streams of thrust-producing airflow during operation. Unlike the engine 10 shown in FIG. 1, the three-stream engine 100 includes a fan that is not ducted by a nacelle or cowl, such that it may be referred to herein as an "unducted fan," or the entire engine 100 may be referred to as an "unducted engine."

For reference, the three-stream engine 100 defines an axial direction A, a radial direction R, and a circumferential direction C. Moreover, the three-stream engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The three-stream engine 100 extends between a forward end 114 and an aft end 116, e.g., along the axial direction A.

The three-stream engine 100 includes a core engine 120 and a fan section 150 positioned upstream thereof. Generally, the core engine 120 includes, in serial flow order, a compressor section, a combustion section, a turbine section, and an exhaust section. Particularly, as shown in FIG. 2, the core engine 120 includes a core cowl 122 that defines an annular core inlet 124. The core cowl 122 further encloses a low pressure system and a high pressure system. In certain examples, the core cowl 122 may enclose and support a booster or low pressure ("LP") compressor 126 for pressurizing the air that enters the core engine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 where fuel is injected into the pressurized air stream and ignited to raise the temperature and energy level of the pressurized air. It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example. After driving each of the turbines 132, 134, the combustion products exit the core engine 120 through a core exhaust nozzle 140 to produce propulsive thrust. Accordingly, the core engine 120 defines a core flowpath or core duct 142 that extends between the core inlet 124 and the core exhaust nozzle 140. The core duct 142 is an annular duct positioned generally inward of the core cowl 122 along the radial direction R.

The fan section 150 includes a fan 152, which is the primary fan in this example. For the depicted example of FIG. 2, the fan 152 is an open rotor or unducted fan. However, in other examples, the fan 152 may be ducted, e.g., by a fan casing or nacelle circumferentially surrounding the fan 152. As depicted, the fan 152 includes an array of fan blades 154 (only one shown in FIG. 2). The fan blades 154 are rotatable, e.g., about the longitudinal axis 112. As noted above, the fan 152 is drivingly coupled with the low pressure turbine 134 via the LP shaft 138. The fan 152 can be directly coupled with the LP shaft 138, e.g., in a direct-drive configuration. Optionally, as shown in FIG. 2, the fan 152 can be coupled with the LP shaft 138 via a speed reduction gearbox 155, e.g., in an indirect-drive or a geared-drive configuration.

Moreover, the fan blades 154 can be arranged in equal spacing around the longitudinal axis 112. Each blade 154 has a root and a tip and a span defined therebetween. Each blade 154 defines a central blade axis 156. For this example, each blade 154 of the fan 152 is rotatable about its respective central blade axes 156, e.g., in unison with one another. One or more actuators 158 can be controlled to pitch the blades 154 about their respective central blade axes 156. However, in other examples, each blade 154 may be fixed or unable to be pitched about its central blade axis 156.

The fan section 150 further includes a fan guide vane array 160 that includes fan guide vanes 162 (only one shown in FIG. 2) disposed around the longitudinal axis 112. For this example, the fan guide vanes 162 are not rotatable about the longitudinal axis 112. Each fan guide vane 162 has a root and a tip and a span defined therebetween. The fan guide vanes 162 may be unshrouded as shown in FIG. 2 or may be shrouded, e.g., by an annular shroud spaced outward from the tips of the fan guide vanes 162 along the radial direction R. Each fan guide vane 162 defines a central blade axis 164. For this example, each fan guide vane 162 of the fan guide vane array 160 is rotatable about its respective central blade axes 164, e.g., in unison with one another. One or more actuators 166 can be controlled to pitch the fan guide vane 162 about their respective central blade axes 164. However, in other examples, each fan guide vane 162 may be fixed or unable to be pitched about its central blade axis 164. The fan guide vanes 162 are mounted to a fan cowl 170.

As shown in FIG. 2, in addition to the fan 152, which is unducted, a ducted fan 184 is included aft of the fan 152, such that the three-stream engine 100 includes both a ducted and an unducted fan that both serve to generate thrust through the movement of air without passage through core engine 120. The ducted fan 184 is shown at about the same axial location as the fan guide vane 162, and radially inward of the fan guide vane 162. Alternatively, the ducted fan 184 may be between the fan guide vane 162 and core duct 142, or be farther forward of the fan guide vane 162. The ducted fan 184 may be driven by the low pressure turbine 134 (e.g., coupled to the LP shaft 138), or by any other suitable source of rotation, and may serve as the first stage of booster or may be operated separately.

The fan cowl 170 annularly encases at least a portion of the core cowl 122 and is generally positioned outward of the core cowl 122 along the radial direction R. Particularly, a downstream section of the fan cowl 170 extends over a forward portion of the core cowl 122 to define a fan flowpath or fan duct 172. Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The stationary struts 174 may each be aerodynamically contoured to direct air flowing thereby. Other struts in addition to the stationary struts 174 may be used to connect and support the fan cowl 170 and/or core cowl 122. In many examples, the fan duct 172 and the core cowl 122 may at least partially co-extend (generally axially) on opposite sides (e.g., opposite radial sides) of the core cowl 122. For example, the fan duct 172 and the core cow 1122 may each extend directly from the leading edge 144 of the core cowl 122 and may partially co-extend generally axially on opposite radial sides of the core cowl.

The three-stream engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the array of fan guide vanes 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R.

Figure 3:
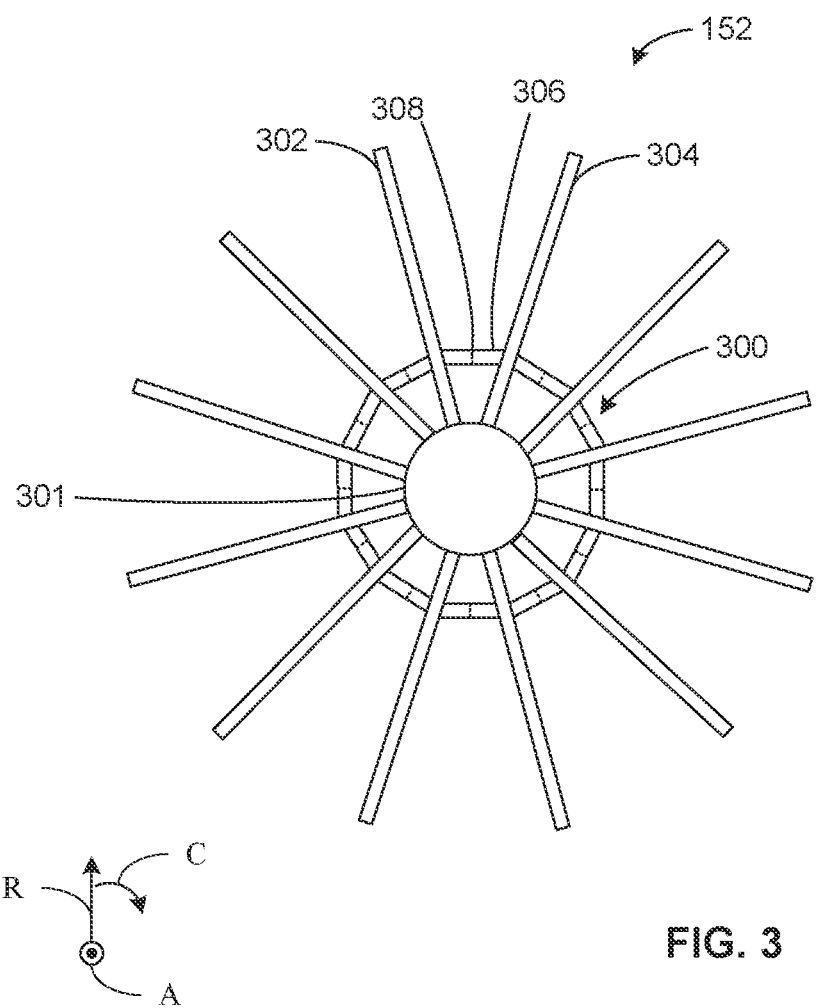
FIG. 3 is a front view of the open rotor of FIG. 1 including a part-span shroud.

FIG. 3 is a front view of the fan 152 of FIG. 1 including an example part-span shroud 300. In FIG. 3, the fan 152 includes a disk 301 with a first blade 302 and a second blade 304 and a portion 306 of the part-span shroud 300. In FIG. 3, the portion 306 includes an example interface 308.

In FIG. 3, the first blade 302 and the second blade 304 are coupled to the disk 301 (e.g., via a dovetail and corresponding slot of the disk 301, etc.). In other examples, the disk 301 and the blades 302, 304 can be unitary (e.g., a casting, via negative manufacturing, via additive manufacturing, etc.). While the disk 301 is described as a disk of an open rotor, in other examples, the teachings of this disclosure can be applied to any other suitable type of rotor (e.g., the fan assembly 14 of FIG. 1, etc.).

The interface 308 of the of the portion 306 of the part-span shroud 300 acts as a joint that reacts circumferential loads between the blades 302, 304. Particularly, the interface 308 enables circumferential loads to be reacted between the blades to reduce deflection caused by P-loading during operation. In some examples, the interface 308 does not react moments (e.g., pitch moments, etc.) between the blades 302, 304. As such, the part-span shroud 300 allows the blades to rotate about the radial axis, which facilities pitch control of the blades 302, 304.

In FIG. 3, the part-span shroud 300 is disposed at 30% of the span of the blades 302, 304. In some examples, the location of the part-span shroud 300 reduces the deflection of the blades 302, 304 near the disk 301 to mitigate the effect of P-loading on the blades 302, 304. In other examples, the part-span shroud 300 can be disposed at any other suitable location on the blades 302, 304 (e.g., less than 50% span, 25% span, etc.).

Figure 4:
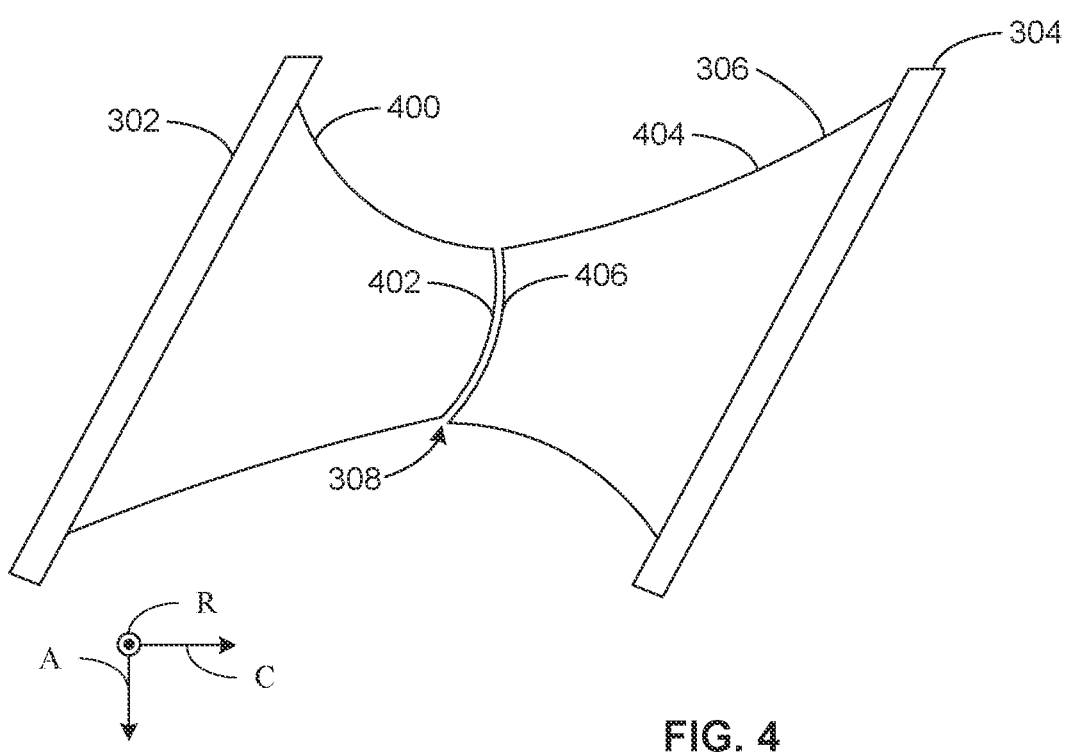
FIG. 4 is top view of the part-span shroud of FIG. 3.

FIG. 4 is top view of the portion 306 of the part-span shroud 300 of FIG. 3. As illustrated in the example of FIG. 4, the interface 308 includes a first portion 400 with a first surface 402 and a second portion 404 with a second surface 406. In FIG. 4, the first portion 400 is coupled to the first blade 302 and the second portion 404 is coupled to the second blade 304. For example, the portions 400, 404 can be coupled to the respective ones of the blades 302, 304 via one or more welds, etc. In other examples, the first portion 400 and the first blade 302 are unitary and/or the first portion 400 and the first blade 302 are unitary. In some such examples, the blades 302, 304 and respective portions 400, 404 can be manufactured via additive manufacturing, negative manufacturing, casting, etc.

In the illustrated example of FIG. 4, the surfaces 402, 406 form the interface 308. In FIG. 4, the interface 308 is a circular interface. In other examples, the interface 308 can have any other suitable shape. In FIG. 4, the first surface 402 is a convex surface and the second surface 406 is a concave surface. In other examples, the first surface 402 is a concave surface and the second surface 406 is a convex surface. In FIG. 4, the portions 400, 404 are configured to abut when the fan 152 is in motion (e.g., the gas turbine engine 10, the gas turbine engine 100, etc.). As such, when the engine is cool (e.g., not operating), the surfaces 402, 406 do not abut. As the fan operates, the blades 302, 304 and the portions 400, 404 expand due to mechanical and thermal loads, causing the surfaces 402, 406 to come into contact with one another. In such examples, the abutment of the first portion 400 and the second portion 404 enables circumferential loads to be reacted between the first portion 400 and the second portion 404, and between the first blade 302 and the second blade 304.

The interface 308 formed by the surfaces 402, 406 enables the portions 400, 404 to rotate relative to other, which permits relative pitch-wise rotation of the blades 302, 304. In some examples, the surfaces 402, 406 can be coated with a friction reducing liner (e.g., polytetrafluoroethylene, plastics, polymers, etc.) and/or otherwise manufactured (e.g., polished, surface treated, etc.) to reduce the friction associated with the abutment and relative movement of the surfaces 402, 406. In the example illustrated above, the curved interface is a circular arc. In other examples, any other suitable type of shape can be employed (e.g., elliptical, hyperbolic, parabolic, cubic, etc.). As such, the part-span shroud 300 facilities the use pitch control of the fan 152, while preventing unwanted deflection of the blades 302, 304 due to 1P-loading.

Figure 5:
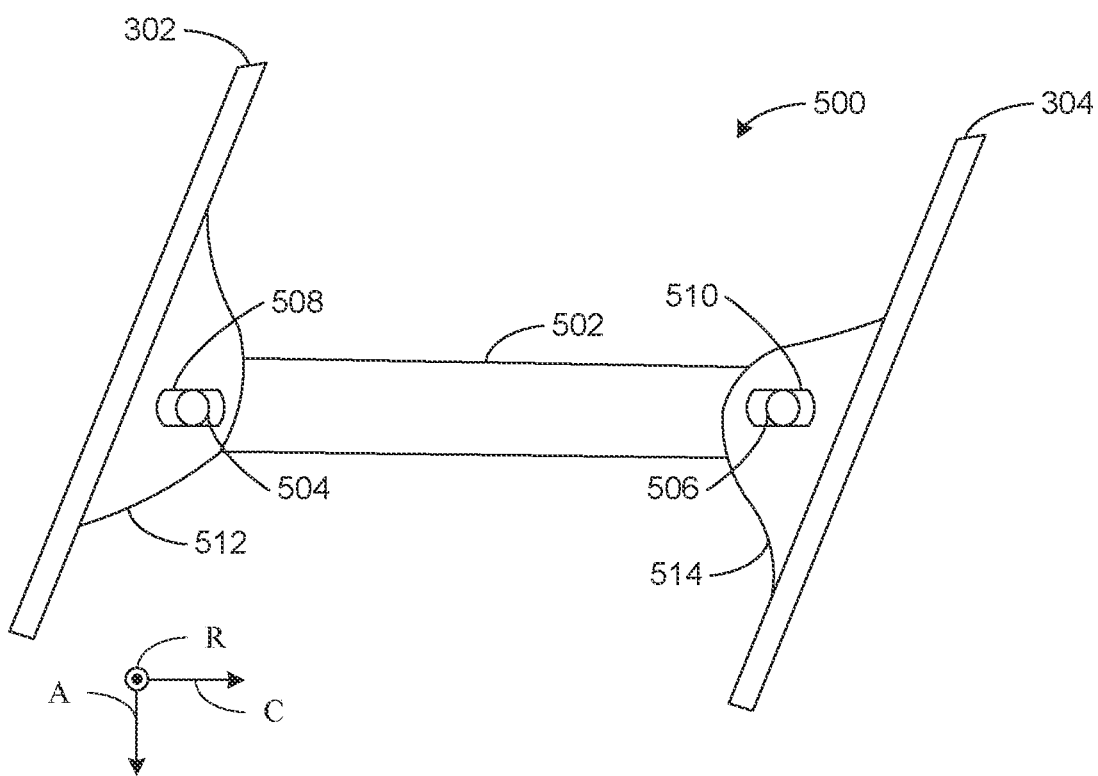
FIG. 5 is top view of an alternative part-span shroud.

FIG. 5 is top view of an alternative part-span shroud 500. In FIG. 5, the alternative part-span shroud 500 extends between the first blade 302 and the second blade 304 of FIG. 3. The part-span shroud 500 includes a first pin 504 and a second pin 506, which are disposed in a first slot 508 and a second slot 510, respectively. In FIG. 5, the slots 508, 510 are formed in a first portion 512 and a second portion 514.

In FIG. 5, the tie rod 502 is rotatably coupled to the first blade 302 via the first pin 504 disposed within the first slot 508 and is rotatably coupled to the second blade 304 via the second pin 506 disposed within the second slot 510. In FIG. 5, the pins 504, 506 are disposed within the slots 508, 510 along the radial axis R. During operation, the pins 504, 506 are able to translate circumferentially within the slots 508, 510, respectively, thereby facilitating the pitch-wise (e.g., radial-wise, etc.) rotation of the blades 302, 304. The tie rod 502 reacts circumferential loads between the blades 302, 304. In FIG. 5, the tie rod 502 is cylindrical and has a solid cross-section. In other examples, the tie rod 502 can have any other suitable shape and/or cross-section (e.g., hallow, etc.).

In FIG. 5, the first portion 512 is coupled to the first blade 302 and the second portion 514 is coupled to the second blade 304. For example, the portions 512, 514 can be coupled to the respective ones of the blades 302, 304 via one or more welds, etc. In other examples, the first portion 512 and the first blade 302 are unitary and/or the second portion 514 and the first blade 302 are unitary. In some such examples, the blades 302, 304 and respective portions 512, 514 can be manufactured via additive manufacturing, negative manufacturing, casting, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Further aspects of the invention are provided by the subject matter of the following clauses:

Example 1 includes an apparatus comprising a first portion extending from a first airfoil, the first portion including a first surface, the first surface being convex, a second portion extending from a second airfoil towards the first airfoil, the second portion including a second surface the first airfoil circumferentially adjacent to the second airfoil, the second surface being concave, and an interface formed by the first surface and the second surface, the interface reacting circumferential loads between the first airfoil and the second airfoil.

Example 2 includes the apparatus of any preceding clause, wherein the interface does not react a moment between the first airfoil and the second airfoil.

Example 3 includes the apparatus of any preceding clause, wherein the interface is a circular joint.

Example 4 includes the apparatus of any preceding clause, wherein at least one of the first surface or the second surface includes a friction reducing liner.

Example 5 includes the apparatus of any preceding clause, wherein the first airfoil and the first portion are unitary.

Example 6 includes the apparatus of any preceding clause, wherein at least one of the first portion or the second portion is disposed at less than 35% of a span of the first airfoil.

Example 7 includes the apparatus of any preceding clause, wherein the first airfoil and the second airfoil are coupled to an open rotor.

Example 8 includes a gas turbine engine comprising a disk, a first airfoil coupled to the disk, a second airfoil coupled to the disk, the first airfoil circumferential adjacent to the first airfoil, and a part-span shroud including a first portion extending from the first airfoil, the first portion including a first surface, the first surface being convex, a second portion extending from the second airfoil towards the first airfoil, the second portion including a second surface the first airfoil circumferentially adjacent to the second airfoil, the second surface being concave, and an interface formed by the first surface and the second surface, the interface reacting circumferential loads between the first airfoil and the second airfoil.

Example 9 includes the gas turbine engine of any preceding clause, wherein the interface does not react a moment between the first airfoil and the second airfoil Example 10 includes the gas turbine engine of any preceding clause, wherein the interface is a circular joint.

Example 11 includes the gas turbine engine of any preceding clause, wherein at least one of the first surface or the second surface includes a friction reducing liner.

Example 12 includes the gas turbine engine of any preceding clause, wherein the first airfoil and the first portion are unitary.

Example 13 includes the gas turbine engine of any preceding clause, wherein at least one of the first portion or the second portion is disposed at less than 35% of a span of the first airfoil.

Example 14 includes the gas turbine engine of any preceding clause, wherein the disk is an open rotor disk.

Example 15 includes an apparatus comprising a first portion extending from a first airfoil, a second portion extending from a second airfoil towards the first airfoil, and a structural member including a first end rotatably coupled to first portion, and a second end rotatably coupled to the second portion.

Example 16 includes the apparatus of any preceding clause, wherein the structural member reacts circumferential loads between the first airfoil and the second airfoil, and the structural member does not react a moment between the first airfoil and the second airfoil.

Example 17 includes the apparatus of any preceding clause, further including a first slot formed in the first portion, a second slot formed in the second portion, a first pin disposed in the first slot, the first pin rotatable coupling the first portion to the structural member, and a second pin disposed in the second slot, the second pin rotatable coupling the second portion to the structural member.

Example 18 includes the apparatus of any preceding clause, wherein the first airfoil and the second airfoil extend radially from a disk and the first pin and the second pin extend along a radial axis.

Example 19 includes the apparatus of any preceding clause, wherein at least one of the first portion or the second portion is disposed at less than 35% of a span of the first airfoil.

Example 20 includes the apparatus of any preceding clause, wherein the first airfoil and the first portion are unitary.

The following claims are hereby incorporated into this Detailed Description by this reference, with each claim standing on its own as a separate embodiment of the present disclosure.

What is claimed is:

1. An apparatus, comprising:
a first portion extending from a first pitch controlled airfoil, the first portion including a first surface, the first surface being convex;
a second portion extending from a second pitch controlled airfoil towards the first pitch controlled airfoil, the second portion including a second surface, the first pitch controlled airfoil circumferentially adjacent to the second pitch controlled airfoil, the second surface being concave; and
an interface formed by the first surface and the second surface, the interface to react to circumferential loads between the first pitch controlled airfoil and the second pitch controlled airfoil, the interface to enable the first pitch controlled airfoil to rotate relative to the second pitch controlled airfoil.

2. The apparatus of claim 1, wherein the interface does not react to a moment between the first pitch controlled airfoil and the second pitch controlled airfoil.

3. The apparatus of claim 2, wherein the interface is a circular joint.

4. The apparatus of claim 1, wherein at least one of the first surface or the second surface includes a friction reducing liner.

5. The apparatus of claim 1, wherein the first pitch controlled airfoil and the first portion are unitary.

6. The apparatus of claim 1, wherein at least one of the first portion or the second portion is disposed at less than 35% of a span of the first pitch controlled airfoil.

7. The apparatus of claim 1, wherein the first pitch controlled airfoil and the second pitch controlled airfoil are coupled to an open rotor.

8. A gas turbine engine comprising:
a disk;
a first pitch controlled airfoil coupled to the disk;

a second pitch controlled airfoil coupled to the disk, the second pitch controlled airfoil circumferentially adjacent to the first pitch controlled airfoil; and a part-span shroud including:
- a first portion extending from the first pitch controlled airfoil, the first portion including a first surface, the first surface being convex;
- a second portion extending from the second pitch controlled airfoil towards the first pitch controlled airfoil, the second portion including a second surface the first pitch controlled airfoil circumferentially adjacent to the second pitch controlled airfoil, the second surface being concave; and
- an interface formed by the first surface and the second surface, the interface to react to circumferential loads between the first pitch controlled airfoil and the second pitch controlled airfoil, the interface to enable the first pitch controlled airfoil to rotate relative to the second pitch controlled airfoil.

9. The gas turbine engine of claim 8, wherein the interface does not react to a moment between the first pitch controlled airfoil and the second pitch controlled airfoil.

10. The gas turbine engine of claim 9, wherein the interface is a circular joint.

11. The gas turbine engine of claim 8, wherein at least one of the first surface and the second surface includes a friction reducing liner.

12. The gas turbine engine of claim 8, wherein the first pitch controlled airfoil and the first portion are unitary.

13. The gas turbine engine of claim 8, wherein at least one of the first portion or the second portion is disposed at less than 35% of a span of the first pitch controlled airfoil.

14. The gas turbine engine of claim 8, wherein the disk is an open rotor disk.

15. An apparatus comprising:
- a first portion extending from a first pitch controlled, the first portion including a first slot;
- a second portion extending from a second pitch controlled airfoil towards the first pitch controlled airfoil; and
- a structural member including:
  - a first end rotatably coupled to the first portion; and
  - a second end rotatably coupled to the second portion; and
- a first pin disposed in the first slot, the first pin rotatable coupling the first portion to the structural member, the first pin circumferentially translatable within the first slot.

16. The apparatus of claim 15, wherein:
- the structural member to react to circumferential loads between the first pitch controlled airfoil and the second pitch controlled airfoil; and
- the structural member does not react to a moment between the first pitch controlled airfoil and the second pitch controlled airfoil.

17. The apparatus of claim 15, wherein the second portion defines a second slot, and further including: a second pin disposed in the second slot, the second pin rotatable coupling the second portion to the structural member.

18. The apparatus of claim 17, wherein the first pitch controlled airfoil and the second pitch controlled airfoil extend radially from a disk and the first pin and the second pin extend along a radial axis.

19. The apparatus of claim 15, wherein at least one of the first portion or the second portion is disposed at less than 35% of a span of the first airfoil.

20. The apparatus of claim 15, wherein the first pitch controlled airfoil and the first portion are unitary.

* * * * *